(12) United States Patent
Tao et al.

(10) Patent No.: US 8,477,788 B2
(45) Date of Patent: Jul. 2, 2013

(54) SLOT BASED PERSISTENT ALLOCATION SCHEME

(75) Inventors: Ming-Hung Tao, Tainan (TW);
Mamadou Kone, Jhudong Township (TW); Ying-Chuan Hsiao, Jhubei (TW)

(73) Assignee: Industrial Technology Research Institute, Chutung, Hsinchu (TW)

( * ) Notice: Subject to any disclaimer, the term of this patent is extended or adjusted under 35 U.S.C. 154(b) by 543 days.

(21) Appl. No.: 12/699,291

(22) Filed: Feb. 3, 2010

(65) Prior Publication Data

US 2010/0226268 A1 Sep. 9, 2010

Related U.S. Application Data

(60) Provisional application No. 61/158,480, filed on Mar. 9, 2009.

(51) Int. Cl.
*H04L 12/56* (2006.01)

(52) U.S. Cl.
USPC .................................................. 370/395.4

(58) Field of Classification Search
USPC ................. 370/241, 252, 310, 315, 316, 319, 370/321, 322, 328, 329, 336, 345, 347, 351, 370/389, 395.1, 395.4, 431, 442, 464, 498; 455/403, 422.1, 450, 462, 464, 39, 500, 507, 455/509
See application file for complete search history.

(56) References Cited

U.S. PATENT DOCUMENTS

| | | | |
|---|---|---|---|
| 6,438,597 B1 | 8/2002 | Mosberger et al. | |
| 7,310,352 B2 | 12/2007 | Beser | |
| 2007/0201392 A1 * | 8/2007 | Ramachandran | 370/315 |
| 2009/0122754 A1 * | 5/2009 | Kang et al. | 370/329 |
| 2009/0207769 A1 * | 8/2009 | Park et al. | 370/311 |
| 2009/0279488 A1 * | 11/2009 | Zheng et al. | 370/329 |

* cited by examiner

*Primary Examiner* — Obaidul Huq
(74) *Attorney, Agent, or Firm* — Finnegan, Henderson, Farabow, Garrett & Dunner, LLP

(57) ABSTRACT

There is provided a method for allocating a mobile station to an available resource slot of a plurality of resource slots within a stream of data frames, the stream of data frames broadcasted to the mobile station by a base station. The method includes scanning resource slots to identify an available resource slot, the available resource slot available for assignment to a resource, wherein the resource slots are included in all of the data frames in the stream of data frames, the scanning further including retrieving a data structure of the available resource slot, the data structure having nodes, the nodes associated with different periodicities and different offsets of the periodicities. The method also includes assigning the mobile station to one of the nodes of the available resource slot with an associated periodicity and an associated offset of the periodicity.

24 Claims, 10 Drawing Sheets

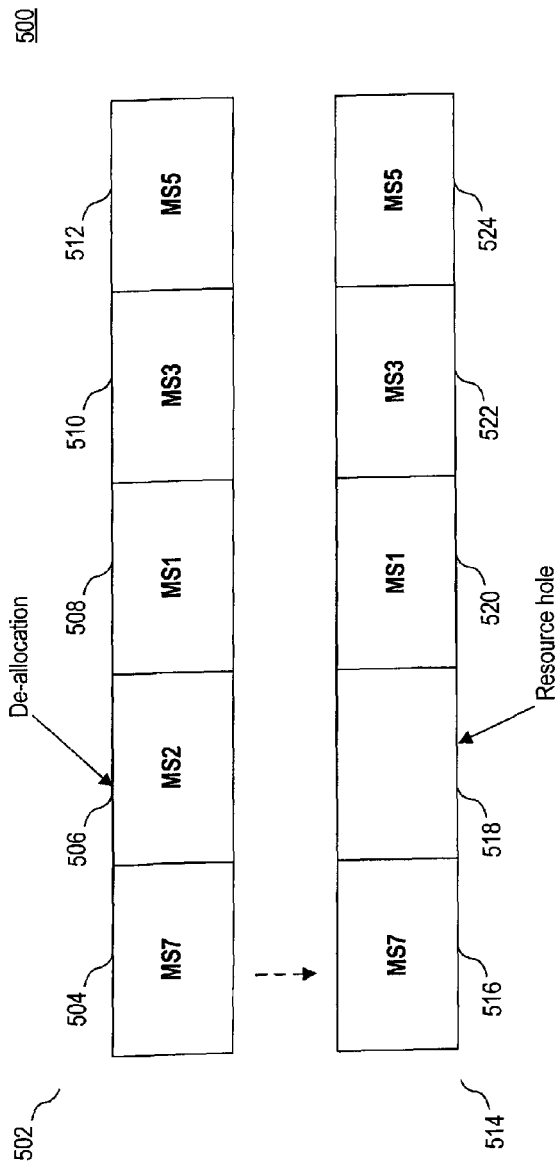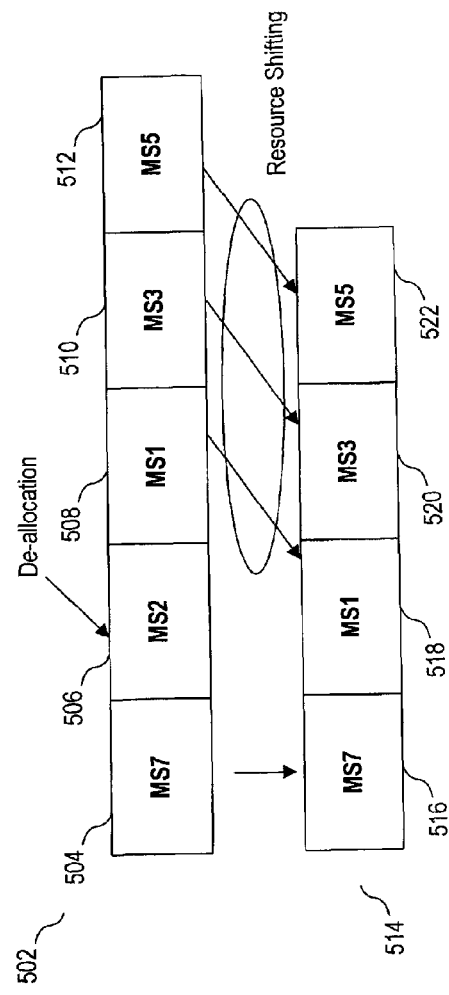
FIG. 5A
FIG. 5B

SLOT BASED PERSISTENT ALLOCATION SCHEME

RELATED APPLICATION

This application claims priority from U.S. Provisional Application No. 61/158,480 filed on Mar. 9, 2009, the entire contents of which are hereby incorporated by reference.

FIELD OF THE INVENTION

The present disclosure relates to systems and methods of resource slot allocation in a communication network.

BACKGROUND

Wireless communication networks enable voice and data services for various mobile electronic devices, such as cellular phones, personal digital assistants, and laptop computers. The increased use of these, and many other, electronic devices has resulted in an increased demand for high-speed, reliable, and efficient wireless communication networks.

FIG. 1 is a diagram illustrating an exemplary wireless communication network 100 for providing wireless services to electronic devices. Network 100 includes base station 102, which provides communication services over a coverage area 104. The services may include voice over IP (VoIP), or other streaming data. Mobile stations 106A, 106B, and 106C are physically located within coverage area 104, and receive the services provided by base station 102.

Each of mobile stations 106A, 106B, and 106C may receive a different service from base station 102. For example, each of mobile stations 106A, 106B, and 106C may be connected to a different VoIP telephone call. Base station 102 broadcasts data frames to mobile stations 106A, 106B, and 106C to provide the different services. Each broadcasted data frame includes data for each of mobile stations 106A, 106B, and 106C. Therefore, when mobile stations 106A, 106B, and 106C receive a broadcasted data frame, they need to determine which portion of the data, in the data frame, is intended for them. As such, mobile stations 106A, 106B, and 106C require additional information to determine which portion of the data, in the data frame, they should process.

FIG. 2 is a diagram illustrating a stream of data frames 200 that is broadcasted by a base station, such as base station 102. Stream 200 includes data frames 202, 204, and 206, which are sequentially broadcasted by the base station. Data frames 202, 204, and 206 each have a bandwidth and a frame length. Moreover, each of data frames 202, 204, and 206 includes data that is intended for several mobile stations. For example, data frame 202 includes data intended for mobile stations A-H.

The mobile stations receiving data frames 202, 204, and 206 need to determine which portion of each received data frame they should read. Accordingly, data frames 202, 204, and 206 include allocation messages 208, 210, and 212, respectively. Allocation messages 208, 210, and 212 list the mobile stations for which the corresponding data frames 202, 204, and 206 are intended. For example, allocation message 208 lists mobile stations A-H. This means that data frame 202 includes information intended for mobile stations A-H. Moreover, for each of listed mobile stations A-H, allocation message 208 also includes a corresponding location, within data frame 202, at which relevant data for each listed mobile station is located.

For example, when mobile station D receives data frame 202, it needs to determine which part of frame 202 is intended for mobile station D. Therefore, mobile station D reads allocation message 208 to determine a location within data frame 202, which contains data intended for mobile station D. Mobile station D then reads the portion of data frame 202 containing that data.

Moreover, allocation messages 208, 210, and 212 are non-persistent in nature. This means that the information provided in allocation messages 208, 210, and 212 is not maintained by the mobile station. Therefore, the same information may be repeated by subsequent allocation messages.

For example, allocation messages 208, 210, and 212 list mobile stations, even when the same mobile stations were listed in a previous allocation message. For example, allocation message 212 lists mobile stations A, B, and H, even though mobile stations A, B, and H were previously listed in allocation messages 208 and 210. This repeated listing of mobile stations A, B, and H in allocation message 212 may introduce unnecessary communications overhead.

SUMMARY

In accordance with the invention, there is provided a method for allocating a mobile station to an available resource slot of a plurality of resource slots within a stream of data frames, the stream of data frames broadcasted to the mobile station by a base station, the method comprising: determining a resource to be provided to the mobile station; scanning the resource slots to identify the available resource slot, the available resource slot available for assignment to the resource, wherein the resource slots are included in all of the data frames in the stream of data frames, the scanning further including retrieving a data structure of the available resource slot, the data structure having nodes, the nodes associated with different periodicities and different offsets of the periodicities; assigning the mobile station to one of the nodes of the available resource slot with an associated periodicity and an associated offset of the periodicity; and broadcasting the resource in the available resource slot, at a location within the stream of data frames indicated by the associated periodicity and the associated offset.

In accordance with this invention, there is further provided a computer-readable medium comprising program instructions, which, when executed by a processor, cause the processor to perform a method for allocating a mobile station to an available resource slot of a plurality of resource slots within a stream of data frames, the stream of data frames broadcasted to the mobile station by a base station, the method comprising: determining a resource to be provided to the mobile station; scanning the resource slots to identify the available resource slot, the available resource slot available for assignment to the resource, wherein the resource slots are included in all of the data frames in the stream of data frames, the scanning further including retrieving a data structure of the available resource slot, the data structure having nodes, the nodes associated with different periodicities and different offsets of the periodicities; assigning the mobile station to one of the nodes of the available resource slot with an associated periodicity and an associated offset of the periodicity; and broadcasting the resource in the available resource slot, at a location within the stream of data frames indicated by the associated periodicity and the associated offset.

In accordance with this invention, there is further provided a base station for allocating a mobile station to an available resource slot of a plurality of resource slots within a stream of data frames, the stream of data frames broadcasted to the mobile station by the base station, the base station comprising: memory configured to store a data structure having nodes, the nodes associated with different periodicities and different offsets of the periodicities; a processor configured to: determine a resource to be provided to the mobile station; and scan the resource slots to identify the available resource slot, the available resource slot available for assignment to the resource, wherein the resource slots are included in all of the data frames in the stream of data frames the scanning further including retrieving the data structure from memory, the data structure associated with the available resource slot; and assign the mobile station to one of the nodes of the available resource slot with an associated periodicity and an associated offset of the periodicity; and an output port configured to broadcast the resource in the available resource slot, at a location within the stream of data frames indicated by the associated periodicity and the associated offset.

Additional advantages of the invention will be set forth in part in the description which follows, and in part will be obvious from the description, or may be learned by practice of the invention. Advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate embodiments of the invention and together with the description, serve to explain principles of the invention.

BRIEF DESCRIPTION OF THE DRAWINGS

FIG. 5A illustrates a resource hole problem that occurs in a region based persistent allocation scheme, consistent with a disclosed embodiment.

FIG. 5B illustrates a solution to the resource hole problem illustrated in FIG. 5A, consistent with a disclosed embodiment.

DESCRIPTION OF THE EMBODIMENTS

Reference will now be made in detail to exemplary embodiments of the invention, examples of which are illustrated in the accompanying drawings. Wherever possible, the same reference numbers will be used throughout the drawings to refer to the same or like parts.

Figure 1:
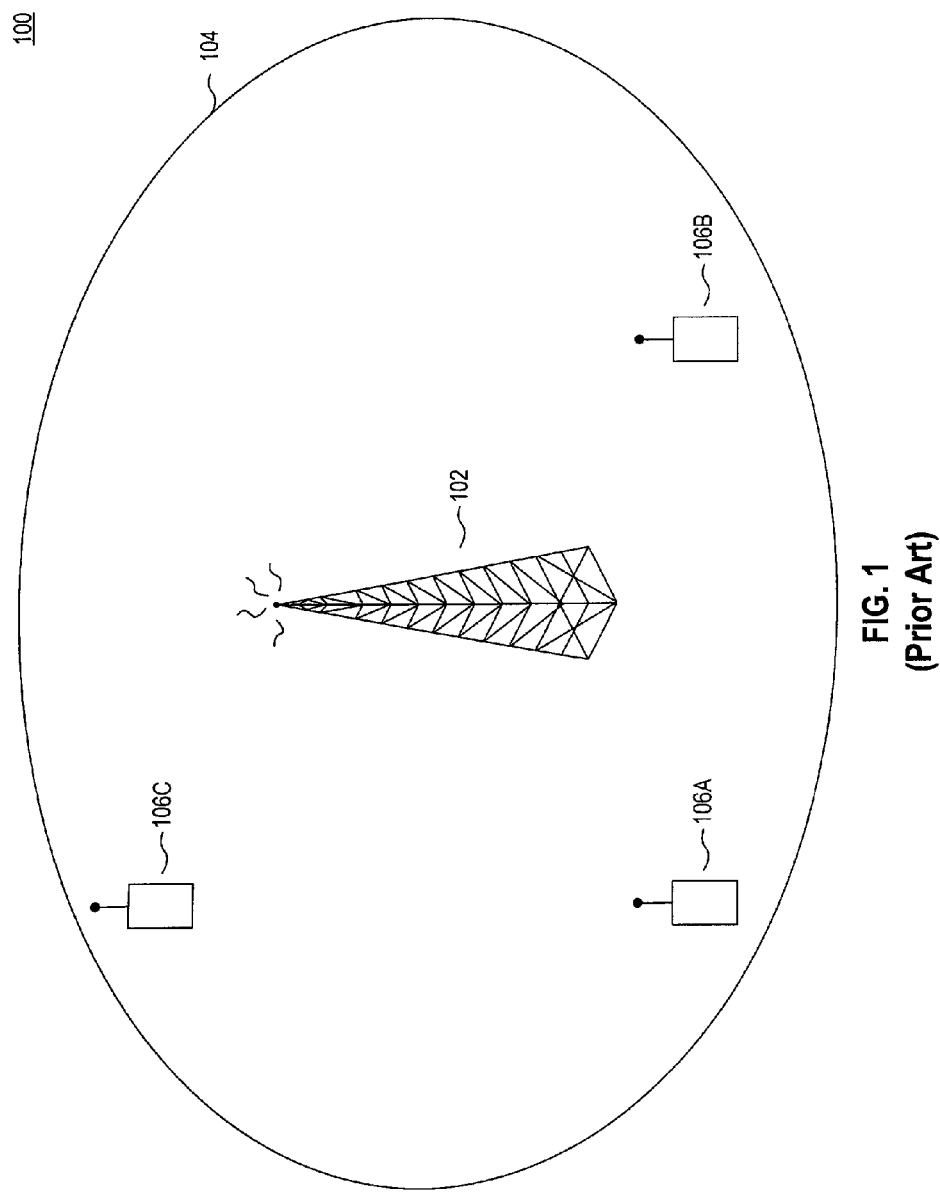
FIG. 1 is a diagram illustrating an exemplary wireless communication network for providing wireless services to electronic devices.
Figure 2:
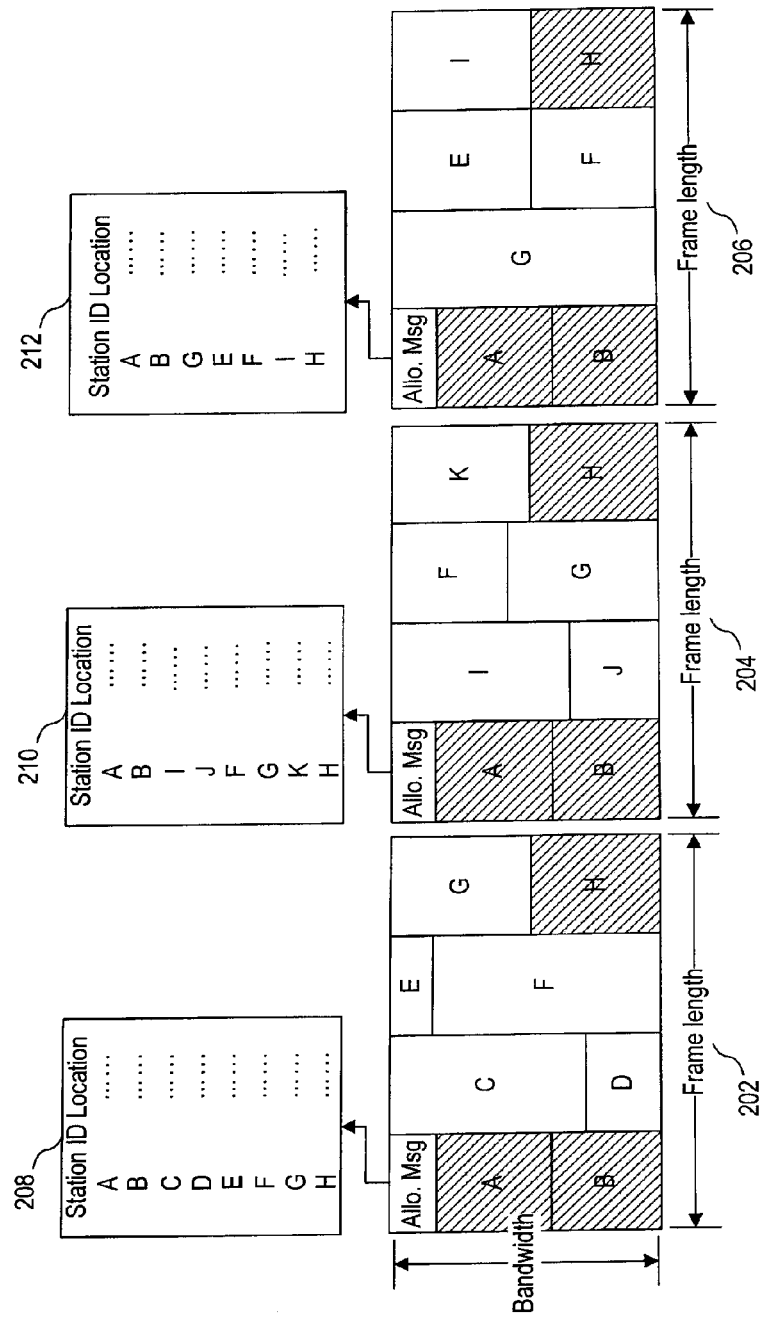
FIG. 2 is a diagram illustrating a stream of data frames, with non-persistent allocation, that is broadcasted by a base station.
Figure 3:
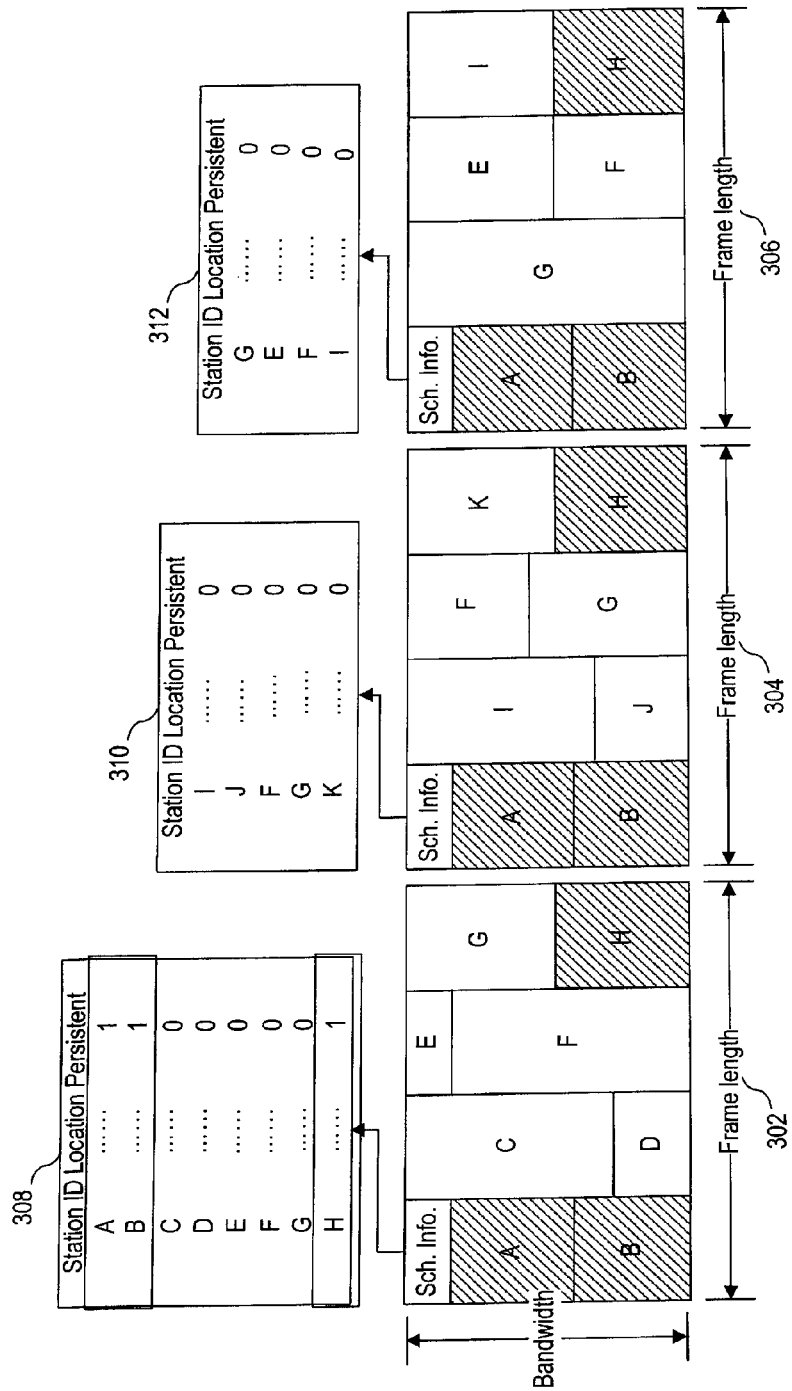
FIG. 3 is a diagram illustrating a stream of data frames, with persistent allocation, broadcasted by a base station, consistent with a disclosed embodiment.

FIG. 3 is a diagram illustrating a stream of data frames 300 that are broadcasted by a base station in sequence, with persistent allocation. Stream 300 includes data frames 302, 304, and 306, which each include data intended for several mobile stations. To enable the mobile stations to determine the portion of data frame 302, 304, or 306 that is relevant, each of data frames 302, 304, and 306 includes a corresponding allocation message 308, 310, and 312, respectively. The allocation messages 308, 310, and 312 each include a list of mobile stations for which the corresponding data frame is intended, as well as a location of relevant information within the corresponding data frame. For example, when a mobile station D receives data frame 302, it examines allocation message 308. As a result, mobile station D identifies itself in allocation message 308, as well as a corresponding location within data frame 302 at which mobile station D can find data intended for it.

Allocation messages 308, 310, and 312 are persistent in nature. This means that information provided in allocation messages 308, 310, and 312 may need to be retained by the mobile station. The mobile station stores an entry read from allocation message 308, 310, and/or 312 if the entry is flagged as persistent. An entry is flagged as persistent if the same entry would otherwise need to be repeated in a subsequent allocation message.

For example, each of data frames 302, 304, and 306 includes data intended for mobile stations A, B, and H at the same location within each of data frames 302, 304, and 306. Thus, it would be redundant to include location information for mobile stations A, B, and H in all three of allocation messages 308, 310, and 312. Accordingly, in allocation message 308, a persistent field is set to 1 for entries corresponding to mobile stations A, B, and H. This informs mobile stations which receive data frame 302, that the data relating to mobile stations A, B, and H will be in the same location in subsequent data frames. Accordingly, data frames 304 and 306 include data intended for mobile stations A, B, and H at the same location as in data frame 302. However, corresponding allocation messages 310 and 312 do not list mobile stations A, B, and H. This decreases the size of allocation messages 310 and 312, thereby reducing communications overhead.

Figure 4:
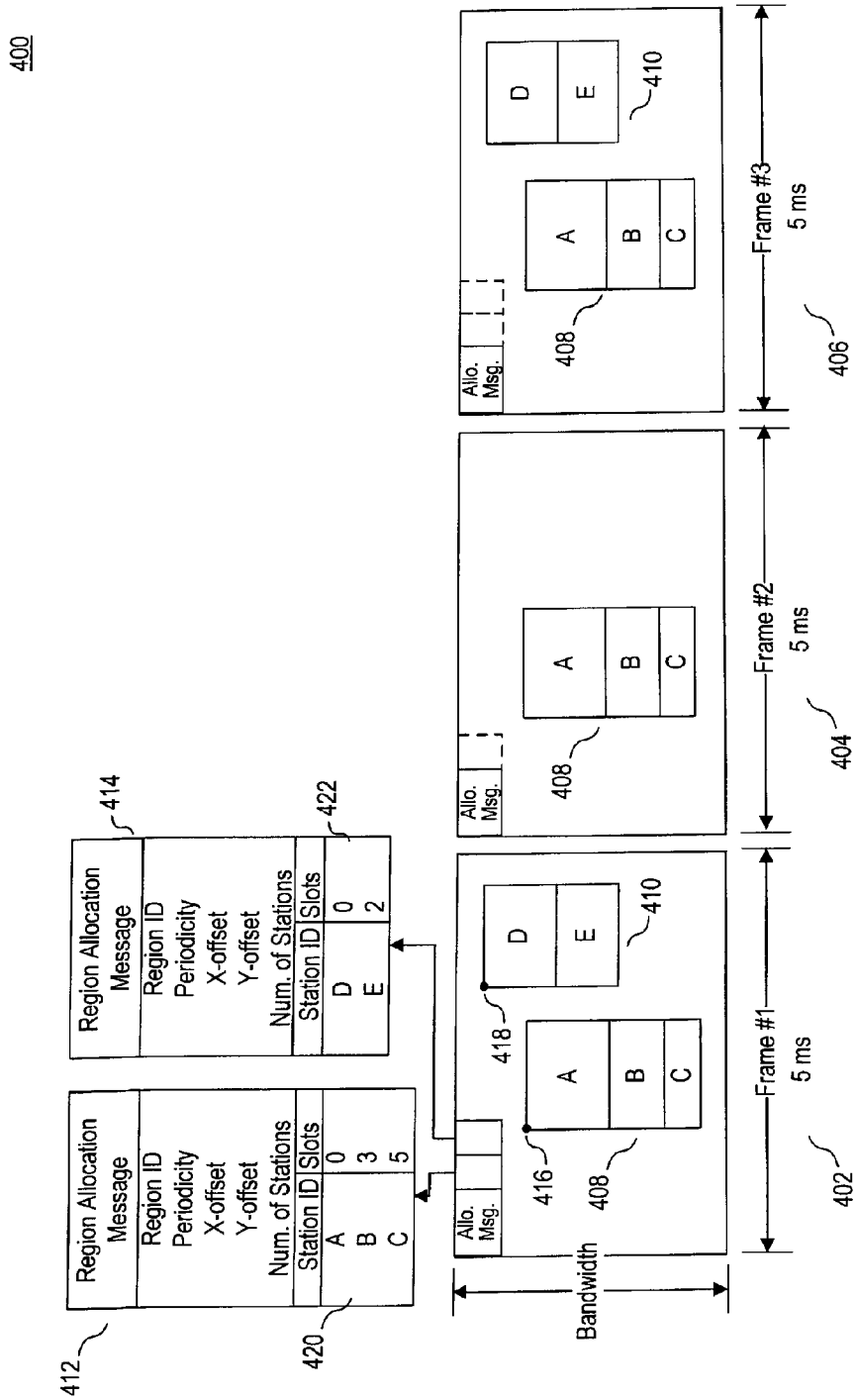
FIG. 4 is a diagram illustrating a stream of data frames, with region based persistent allocation, broadcasted by a base station, consistent with a disclosed embodiment.

FIG. 4 is a diagram illustrating a stream of data frames 400 that are broadcasted by a base station in sequence, with region based persistent allocation. Stream 400 includes data frames 402, 404, and 406, each with an exemplary frame length of 5 ms and a designated bandwidth. Data frames 402, 404, and 406 each include a region 408, while data frames 402 and 406 each additionally include a region 410. Region 408 includes data intended for mobile stations A, B, and C, while region 410 includes data intended for mobile stations D and E. In other words, mobile stations A, B, and C are grouped separately from mobile stations D and E.

Data frame 402 also includes region allocation messages 412 and 414. Region allocation message 412 describes region 408, while region allocation message 414 describes region 410. Region allocation messages 412 and 414 each include fields for Region ID, Periodicity, X-offset, Y-offset, and Number of Stations. The Region ID field is the identifier of the corresponding region. Therefore, the region ID for region allocation message 412 identifies corresponding region 408, while the region ID for region allocation message 414 identifies corresponding region 410.

The Periodicity field identifies the frequency at which the corresponding region occurs in the data frames. For example, the periodicity for region allocation message 412 indicates that corresponding region 408 occurs in every data frame. This is the case, because each of data frames 402, 404, and 406 includes region 408. Moreover, the periodicity of region allocation message 414 indicates that corresponding region 410 occurs every other data frame. This is the case, because data frame 402 includes region 410, data frame 404 does not include region 410, and data frame 406 does include region 410.

The X-offset and Y-offset fields identify a location within the data frame of the corresponding region. For example, the X-offset and Y-offset fields in region allocation message 412 specify coordinate 416, at which region 408 starts. Similarly, the X-offset and Y-offset fields in region allocation message 414 indicate coordinate 418, at which region 410 starts.

The Number of Stations field indicates the number of mobile stations included in the corresponding region. For example, the Number of Stations field for region allocation message 412 would be three, because region 408 includes data for mobile stations A, B, and C. Similarly, the Number of Stations field for region allocation message 414 would be two, because region 410 includes data for mobile stations D and E.

Region allocation messages 412 and 414 also include location tables 420 and 422, respectively. Location tables 420 and 422 specify a slot at which data for each mobile station is located, within the corresponding region. The slot specified is relative to the X-offset and Y-offset of the corresponding region. For example, location table 420 indicates the location of data intended for mobile stations A, B, and C, within region 408. Because data for mobile station A is located at the top of region 408, the slot value is 0. In other words, data for mobile station A is located 0 slots from coordinate 416. Furthermore, because data for mobile station B is located after data for mobile station A, the slot value for mobile station B is larger than 0, in this case 3. In other words, data for mobile station B is located 3 slots from coordinate 416. Similarly, because data for mobile station C is located after data for mobile stations A and B, the slot value for mobile station C is larger than 0 or 3, in this case 5. In other words, data for mobile station C is located 5 slots from coordinate 416. The values in location table 422 are determined in a similar manner.

Region allocation messages 412 and 414 are persistent messages, such that they are retained by the mobile stations that read them. Therefore, region allocation messages 412 and 414 may not need to be sent multiple times if there is no change in their corresponding regions 408 and 410.

As discussed, region allocation messages 412 and 414 occur in data frame 402. This is because corresponding regions 408 and 410 are included in data frame 402, and because region allocations messages 412 and 414 are needed to specify to mobile stations how to decode data frame 402.

Moreover, subsequent data frame 404 includes region 408 and does not include region 410. Therefore, there would be no need for data frame 404 to include region allocation message 414, which describes region 410. Furthermore, region allocation message 412 would be included in data frame 404 only if region allocation message 412 was changed, and therefore necessary to enable the mobile stations to decode data frame 404.

However, because region allocation message 412 is a persistent message, it is retained by the mobile stations for which it is intended. Therefore, if there are no changes to region allocation message 412, it also does not need to be included in data frame 404, even though corresponding region 408 is included in data frame 404. For this reason, region allocation message 412 is shown as an optional dotted box within data frame 404.

Data frame 406 includes both region 408 and region 410. Because region allocation messages 412 and 414 are persistent messages, they are retained by the respective mobile stations for which they are intended. Therefore, if there are no changes to region allocation messages 412 and 414, they do not need to be included in data frame 406, even though corresponding region 408 and 410 are included in data frame 406. For this reason, region allocation messages 412 and 414 are shown as optional dotted boxes within data frame 404.

If changes occurred to either regions 408 and/or 410, then it would be necessary to include corresponding region allocation messages 412 and/or 414 in subsequent data frames.

FIG. 5A illustrates a resource hole problem that occurs in the region based persistent allocation scheme illustrated in FIG. 4. FIG. 5A illustrates a region 502, which includes portions of data intended for several mobile stations. Region 502 may be broadcast from a base station, in a data frame, to the intended mobile stations. The intended mobile stations then read one of the portions of the region that is intended for it. As such, region 502 is similar to regions 408 and 410 in FIG. 4.

Region 502 includes portions 504, 506, 508, 510, and 512, each of which includes data for services that are intended for different mobile stations (MSs). Portion 504 includes data intended for a MS 7, portion 506 includes data intended for a MS2, portion 508 includes data intended for a MS1, portion 510 includes data intended for a MS3, and portion 512 includes data intended for a MS5. Region 502 may be included in several data frames that are sequentially broadcasted from a base station to several mobile stations.

Eventually, the base station may seek to stop providing one of the services to one of the mobile stations. For example, the base station may be providing services related to a VoIP telephone call to MS2, which eventually ends. When the VoIP call ends, the base station no longer sends data supporting the VoIP call to MS2. In that case, the base station de-allocates MS2 by not including data supporting the ended VoIP call in corresponding portion 506.

After MS2 is de-allocated from portion 506, an updated region 514 of a subsequent data frame remains. Updated region 514 includes portions 516, 518, 520, 522, and 524. Portion 516 includes data intended for MS7, portion 518 is empty, portion 520 includes data intended for MS1, portion 522 includes data intended for MS3, and portion 524 includes data intended for MS5. Portion 518 is a resource hole, because it contains no data and is located in between other allocated portions. This resource hole is an inefficient use of bandwidth because updated region 514 includes five portions, but only has data allocated to four of the portions. Therefore, updated region 514 is unnecessarily large.

FIG. 5B illustrates a solution to the resource hole problem. FIG. 5B also illustrates region 502 having portions 504, 506, 508, 510, and 512. Region 502 may be broadcast from a base station, in a data frame, to the intended mobile stations. The intended mobile stations then read one of the portions of the region that is intended for it. As such, region 502 is similar to regions 408 and 410 in FIG. 4.

FIG. 5B also illustrates updated region 514. After de-allocating MS2 from 506, MS1, MS3, and MS5 are shifted from portions 508, 510, and 512, respectively, in region 502, to portions 518, 520, and 522, in region 514. Therefore, portion 518 does not become a resource hole, as was the case in FIG. 5A. As a result, updated region 514 in FIG. 5B includes four portions, and has data included in to all four portions. As such, updated region 514 in FIG. 5B is smaller and more efficient than updated region 514 in FIG. 5A.

The resource hole problem and solution outlined in FIGS. 5A and 5B introduces additional communications overhead. For example, each time the base station allocates or de-allocates a mobile station from a region, the base station needs to include a region allocation message in the next frame for the corresponding region. Region allocation messages are also included for portions of the region that are shifted. This is because, as discussed, region allocation messages are included in a subsequent data frame if there is a change to a corresponding portion in the data frame. Moreover, even after a base station includes a region allocation message in a data frame broadcasted to mobile stations, the base station needs to ensure that the mobile stations successfully received the broadcasted region allocation message. Therefore, a feedback channel is used by the mobile stations to verify receipt of region allocation messages. This feedback channel is an additional source of communication overhead.

Figure 6:
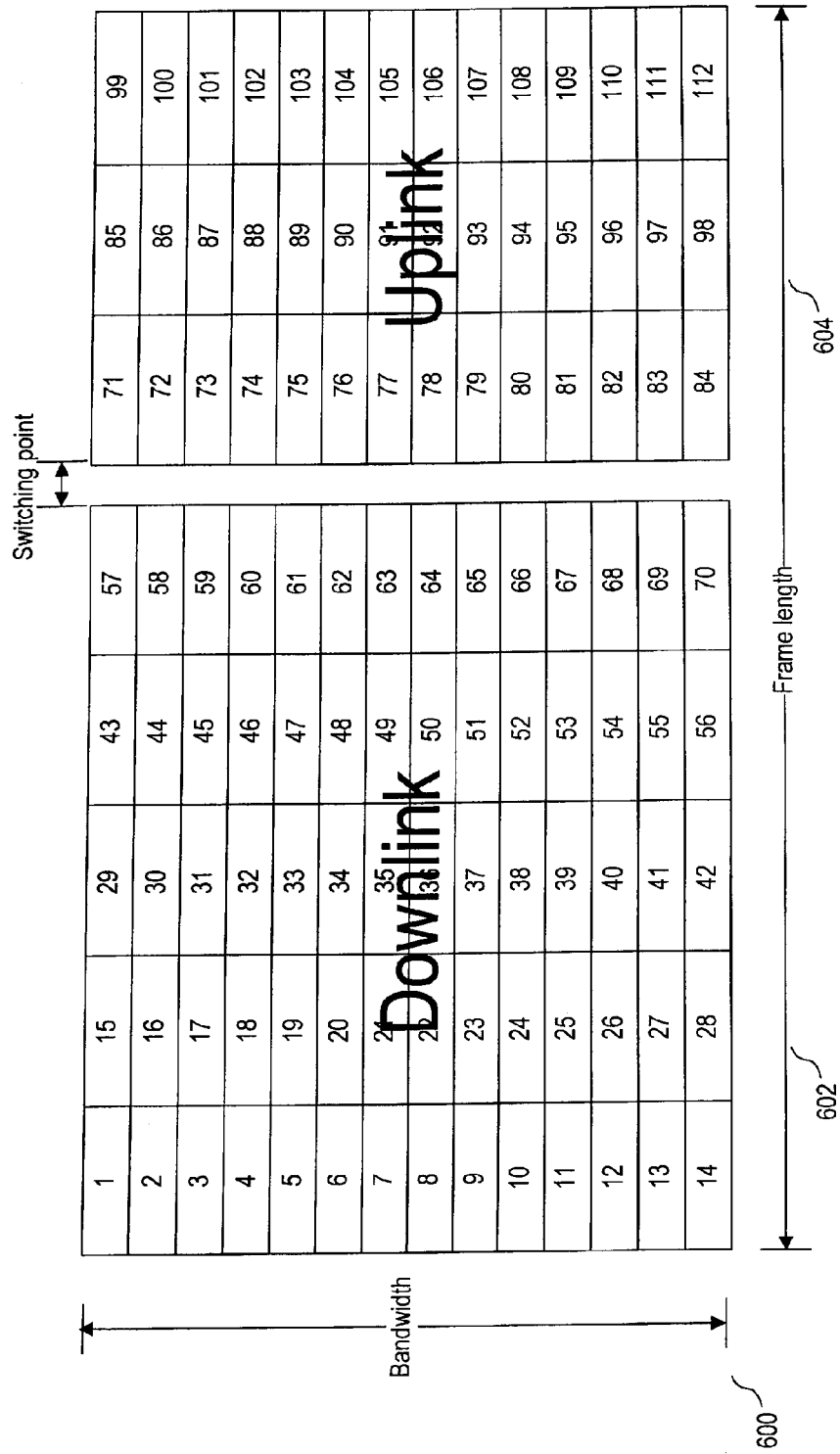
FIG. 6 illustrates a data frame divided into resource slots, consistent with a disclosed embodiment.

Accordingly, instead of dividing a data frame into regions, the base station can divide the data frame into resource slots. FIG. 6 illustrates a data frame 600, which is divided into resource slots. The resource slots are of equal size, and may also be referred to as logical resource units (LRUs). Data frame 600 is of a particular bandwidth and frame length. Moreover, data frame 600 includes a downlink section 602 and an uplink section 604, which are separated at a switching point. In this example, downlink section 602 includes resource slots 1-70, while uplink section 604 includes resource slots 71-112. The resource slots are allocated to mobile stations, either persistently or non-persistently.

Data frame 600 is an example of a data frame format that is broadcasted by a base station on a regular basis, for example, as a stream of data frames. Therefore, data frames are broadcasted by the base station, using the same format, regularly over time. Each resource slot illustrated in data frame 600 occurs in data frame broadcasted by the base station. Therefore, the resource slots can be allocated to different mobile stations over time.

An allocation of resource slots to a mobile station should include the following parameters in an allocation or scheduling message: identifier of the mobile station, number of occupied slots, a flag indicating whether the allocation is persistent or not, and a periodicity. The periodicity indicates at which time periods data frames will be broadcasted that include resource slots allocated to the mobile station. For example, the mobile station may only need to receive information from every third data frame that is broadcasted in the stream of data frames. In such case, the base station would only allocate resource slots to the mobile station in every third data frame in the stream. Moreover, the periodicity would be applicable only when the flag was set to persistent.

The manner by which the base station allocates resource slots among the mobile stations, over time, is by creating a data structure for each resource slot in a data frame, such as the resources slots in data frame 600 in FIG. 6. In particular, the base station may create a tree data structure for each resource slot to schedule mobile stations. Because the resource slot occurs in subsequently broadcasted data frames over time, the resource slot may be scheduled over multiple data frames broadcasted over time in a stream of data frames.

Figure 7:
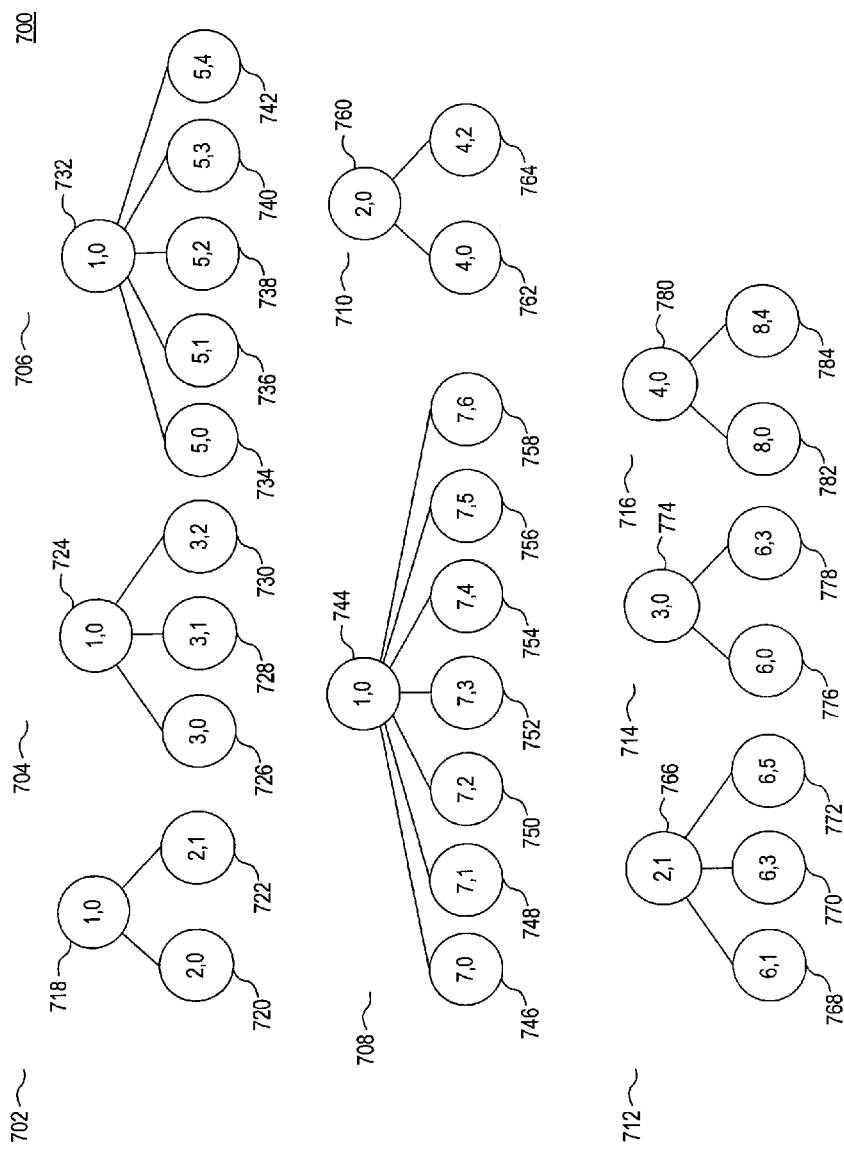
FIG. 7 includes persistent allocation trees (PATs), consistent with a disclosed embodiment.

FIG. 7 includes persistent allocation trees (PATs) 700 for scheduling resource slots to mobile stations. Each PAT 700 is associated with a resource slot being scheduled. Each PAT 700 includes one or more nodes. The nodes can be assigned to mobile stations, in order to schedule the mobile stations. In other words, the nodes schedule mobile stations to the resource slot associated with the corresponding PAT.

More particularly, FIG. 7 PATs 700 include individual PATs 702-716. PATs 702-716 are examples of PATs that can each be associated with a resource slot to schedule mobile stations. PAT 702 includes nodes 718-722, PAT 704 includes nodes 724-730, PAT 706 includes nodes 732-742, PAT 708 includes nodes 744-758, PAT 710 includes nodes 760-764, PAT 712 includes nodes 766-772, PAT 714 includes nodes 774-778, and PAT 780 includes nodes 780-784.

A resource slot is included in consecutive data frames in a stream of data frames. Thus, the same resource slot may be allocated to different mobile stations depending on the data frame. It is for this reason that the resource slot is represented by a PAT. Each node in the PAT represents a time of the resource slot that is available for allocation by a mobile station. The resource slot can be allocated to different mobile stations at different times.

For example, both mobile stations D and E from FIG. 4 may each need a resource slot in every second data frame from a stream of data frames. Therefore, it may be possible to allocate the resource slot to mobile station D at data frame 1, and allocate the same resource slot to mobile station E at data frame 2, and then allocate the resource slot back to mobile station D at data frame 3, etc. This is because neither mobile station D nor mobile station E require the resource slot at every data frame. Thus, they can share the resource slot at different points in time. The nodes of a PAT associated with the resource slot, enable this type of scheduling of the resource slot.

To accomplish this, each node of a PAT is identified as a set of two numbers ($S_c$, $S_o$). The first number $S_c$ represents the periodicity of the mobile station being allocated to the node. For example, if $S_c=1$, then the node represents an allocation of the mobile station to the corresponding resource slot at every data frame. If $S_c=2$, then the node represents an allocation of the mobile station to the corresponding resource slot at every second data frame. If $S_c=3$, then the node represents an allocation of the mobile station to the corresponding resource slot at every third data frame, etc. FIG. 7 includes nodes with a periodicity up to eight, i.e., $1 \leq S_c \leq 8$. However, this periodicity value is exemplary only.

The second number $S_o$ represents an offset of the periodicity allocation. The offset $S_o$ indicates a specific point, within a period identified by the periodicity, for allocation to the mobile station, such that the range of $S_o$ is $0 \leq S_o < S_c$. For example, as discussed, if the periodicity for a node is $S_c=3$, this means that data assigned to the corresponding resource slot is broadcasted from a base station to the mobile station every third data frame. In other words, for a stream of data frames numbered X00-X08, wherein X is any positive integer, the data could be broadcast in data frames X00, X03, and X06. Alternatively, the data could be broadcasted in data frames, X01, X04, and X07, or in data frames X02, X05, and X08. Because of these different possibilities an offset of the periodicity allocation is provided.

Continuing with this example in which $S_c=3$ for a node, if the offset is $S_o=0$, then the data is included in data frames X00, X03, and X06. However, for example, if the offset is $S_o=1$, then a shift occurs, and the data is included in data frames X01, X04, and X07. Further, for example, if the offset is $S_o=2$, then an additional shift occurs, and the data is included in data frames X02, X05, and X08. In more general terms, for a data frame sequence number F, the following equation describes the allocation of the resource slot as a function of $S_c$ and $S_o$:

$$F \bmod S_c = S_o, \qquad \text{[Equation 1].}$$

For these reasons, a combination of periodicity and offset ($S_c$, $S_o$) may be used for allocating mobile stations to a resource slot over time by a base station.

Trees 702-716 each include a single root node, and multiple child nodes. The root node has a periodicity value $S_c$ that is lower than a periodicity value of its child nodes. The larger number of child nodes, and the higher periodicity of the child nodes, indicate that the child nodes represent a division of a resource represented by the parent node.

For example, tree 702 includes a root node 718 with a value of (1, 0), indicating a periodicity $S_c$ of 1 and an offset $S_o$ of 0. Thus, if root node 718 is assigned to a mobile station, then the corresponding resource slot is allocated to the mobile station for all data frames in the stream of data frames. Therefore, root node 718 represents a full allocation of the resource slot over time.

By contrast, child nodes 720 and 722 divide the full allocation represented by root node 718 and, therefore, each indicate a partial allocation of the resource slot. For example, both child nodes 720 and 722 have a periodicity $S_c$=2, which indicates that each of child nodes 720 and 722 allocates a mobile station to the corresponding resource slot at every other data frame. Thus, child nodes 720 and 722 each represent half of the allocation of root node 718. Moreover, by setting the offset $S_o$=0 for child node 720 and the offset $S_o$=1 for child node 722, child nodes 720 and 722 share the 2 time slots. In other words, the offsets for child nodes 720 and 722 indicate different halves of the resources represented by child nodes 720 and 722.

Figure 8:
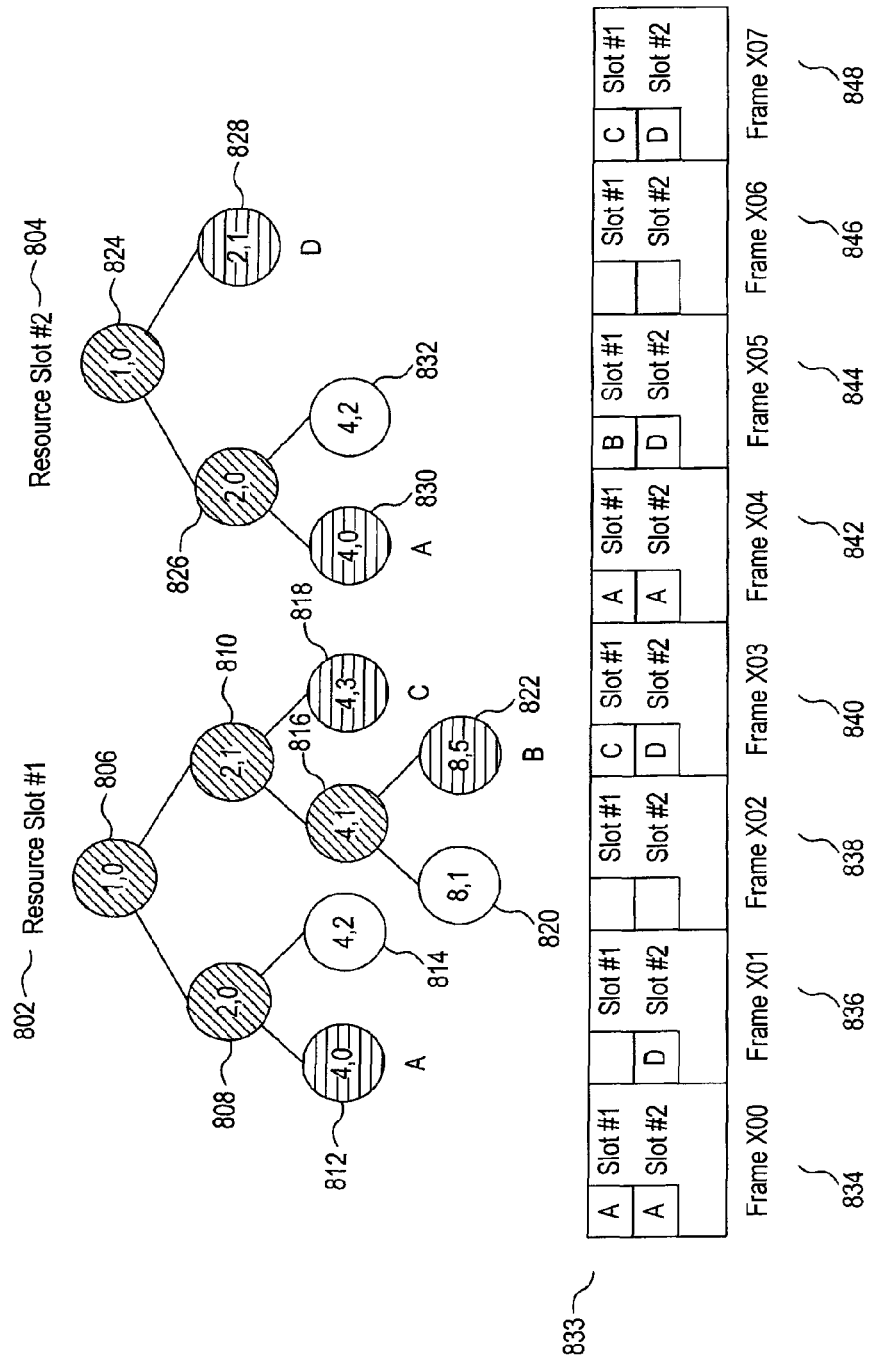
FIG. 8 is a diagram illustrating PATs with corresponding data frames, consistent with a disclosed embodiment.

FIG. 8 is a diagram illustrating PATs with corresponding data frames. FIG. 8 includes tree 802, which corresponds to a Resource Slot #1, and tree 804, which correspond to a Resource Slot #2. Resource Slot #1 and Resource Slot #2 are similar to any of resource slots 1-112 illustrated in FIG. 6. Tree 802 include nodes 806-822, and tree 804 includes nodes 824-832.

For Resource Slot #1, nodes 812, 822, and 818 are marked with horizontal cross-hatching to indicate they are designated for allocation. In particular, node 812 is assigned to a mobile station A, node 822 is assigned to a mobile station B, and node 818 is assigned to a mobile station C. For Resource Slot #2, nodes 830 and 828 are marked with horizontal cross-hatching to indicate they are designated for allocation. In particular, node 830 is assigned to mobile station A, and node 828 is assigned to a mobile station D.

When a node is assigned to a mobile station, all parent nodes of the assigned node and any child nodes of the assigned node are blocked from being assigned elsewhere. This prevents scheduling collisions. As discussed, a child node represents a division of resources represented by its parent node. Therefore, if a child node is assigned to a mobile station, any allocation to the parent node would be an assignment of the same resource of the child node. Additionally, if a parent node is assigned to a mobile station, any allocation to the child node would be an assignment of the same resource of the parent node.

For example, since node 812 is allocated to mobile station A, its parent nodes, 808 and 806 are blocked from being assigned. Similarly, parent nodes of nodes 822, 818, 830, and 828 are also blocked from being assigned. Parent nodes 806, 808, 810, 816, 824, and 826, which are blocked from being assigned, are shown in FIG. 8 in a diagonal cross-hatching pattern.

FIG. 8 also includes a stream of data frames 833. Stream of data frames 833 include data frames 834-848, which are sequentially broadcast by a base station to a coverage area, and are received by mobile stations located within the coverage area. Data frames 834-848 are sequentially numbered as frames X00-X07, wherein X is a positive integer. Moreover, each of data frames 834-848 includes a resource slot #1 and a resource slot #2. As such, trees 802 and 804 allocate resource slot #1 and resource slot #2 to data frames 834-848. In other words, using trees 802 and 804, a base station may allocate a mobile station to an available resource slot of a plurality of resource slots within a stream of data frames. The stream of data frames may be broadcasted to the mobile station by the base station.

The base station may assign a mobile station to a node of an available resource slot. For example, mobile station A is allocated to Resource Slot #1 by node 812, and is allocated to Resource Slot #2 by node 830. Both nodes 812 and 830 have a value ($S_c$, $S_o$) of (4, 0), corresponding to their associated periodicity and associated offset of the periodicity. To determine at which frame to allocate mobile station A for Resource Slot #1 and Resource Slot #2, Equation 1 is applied. Equation 1, F mod $S_c$=$S_o$ is satisfied for a frame F=X00 and F=X04, with $S_c$=4, and $S_o$=0. Therefore, data frames 834 and 842, which correspond to frame numbers X00 and X04, respectively, include mobile station A at their Resource Slot #1 and Resources Slot #2.

Mobile station B is allocated to Resources Slot #1 by node 822, and is not allocated to Resource Slot #2. Node 822 has a value ($S_c$, $S_o$) of (8, 5), corresponding to its associated periodicity and associated offset of the periodicity. To determine at which frame to allocate mobile station B for Resource Slot #1, Equation 1 is applied. Equation 1 is satisfied for a frame F=X05, with $S_c$=8, and $S_o$=5. Therefore, data frame 844, which corresponds to frame number X05, includes mobile station B at its Resource Slot #1.

Mobile station C is allocated to Resources Slot #1 by node 818, and is not allocated to Resource Slot #2. Node 818 has a value ($S_c$, $S_o$) of (4, 3), corresponding to its associated periodicity and associated offset of the periodicity. To determine at which frame to allocate mobile station C for Resource Slot #1, Equation 1 is applied. Equation 1 is satisfied for frames F=X03 and F=X07, with $S_c$=4, and $S_o$=3. Therefore, data frames 840 and 848, which correspond to frame numbers X03 and X07, respectively, include mobile station C at their Resource Slot #1.

Mobile station D is allocated to Resources Slot #2 by node 828, and is not allocated to Resource Slot #1. Node 828 has a value ($S_c$, $S_o$) of (2, 1), corresponding to its associated periodicity and associated offset of the periodicity. To determine at which frame to allocate mobile station D for Resource Slot #2, Equation 1 is applied. Equation 1 is satisfied for frames F=X01, F=X03, F=X05, and F=X07, with $S_c$=2, and $S_o$=1. Therefore, data frames 836, 840, 844, and 848, which correspond to frame numbers X01, X03, X05, and X07, respectively, includes mobile station D at their Resource Slot #2.

As discussed above, for values of periodicity $S_c$ of a resource slot, there may be several corresponding offset $S_o$ values. The periodicity $S_c$ indicates a number of time slots that can be divided into offsets. For example, for a periodicity $S_c$=4, there exists corresponding offsets $S_o$=0, $S_o$=1, $S_o$=2, $S_o$=3. The offsets identify consecutive points in time, within the periodicity. For a periodicity $S_c$=4, the offset of $S_o$=0 identifies a first time slot out of the four available time slots; the offset of $S_o$=1 identifies a second time slot; the offset $S_o$=2 identifies a third time slot; and the offset $S_o$=3 identifies a fourth and final time slot.

The time slots may be used in broadcasting the resource. In particular, after a base station assigns a mobile station to a node of an available resource slot, the base station may broadcast the resource in the available resource slot, at a location or time slot within the stream of data frames indicated by the associated periodicity and the associated offset.

Depending on the type of service received at the mobile station, different scheduling principles may be used for persistent resource allocation. It is assumed that there are two types of mobile stations, i.e., non-emergent mobile stations and emergent mobile stations. In either case, a base station may scan resource slots to identify an available resource slot available for assignment to a resource. The scanning may include retrieving a data structure, such as a PAT, of the available resource slot. The data structure may have nodes associated with different periodicities and different offsets of the periodicities.

Non-emergent mobile stations subscribe to a service that has a loose delay requirement. In other words, non-emergent mobile stations can withstand some delay in receiving data from a base station. Therefore, when allocating resources to the non-emergent mobile station, the base station scans from a first resource slot to a last resource slot to find a resource slot with an available PAT node. However, the base station may stop scanning when it finds a resource slot with an available PAT node. The first available PAT node of a resource slot, which is found while scanning, is allocated to the non-emergent mobile station. The first available PAT node may not necessarily be the earliest node, i.e., the node with the smallest offset $S_o$. However, because the mobile station has a loose delay requirement, the base station does not try to find the smallest offset $S_o$, because there is no need to expend processing power to minimize delay to the mobile station. Moreover, if the base station cannot determine a suitable empty PAT node, then the base station will create a new PAT node.

By contrast, emergent mobile stations subscribe to a service that has a strict delay requirement. In other words, emergent mobile stations can withstand minimal delay in receiving data from a base station. Therefore, the base station scans resource slots for one that has available a particular offset value $S_o$. The offset value $S_o$ that the base station allocates to the emergent mobile station is used, with other factors, to determine the delay of the service provided by the base station. In this way, by choosing a particular offset value $S_o$ the base station can ensure that the provided service can meet the strict delay requirements of the emergent mobile station.

In some situations, the base station needs to allocate a resource to multiple continuous slots. In such situations, the base station allocates adjacent resource slots to the resource. Each of the adjacent resource slots has its own PAT. The base station allocates the same node, i.e., a common node, within each of the PATs of the adjacent resource slots, to the resource. Therefore, each node assigned to the resource in the adjacent resource slots, has the same periodicity and offset value $(S_c, S_o)$.

Figure 9:
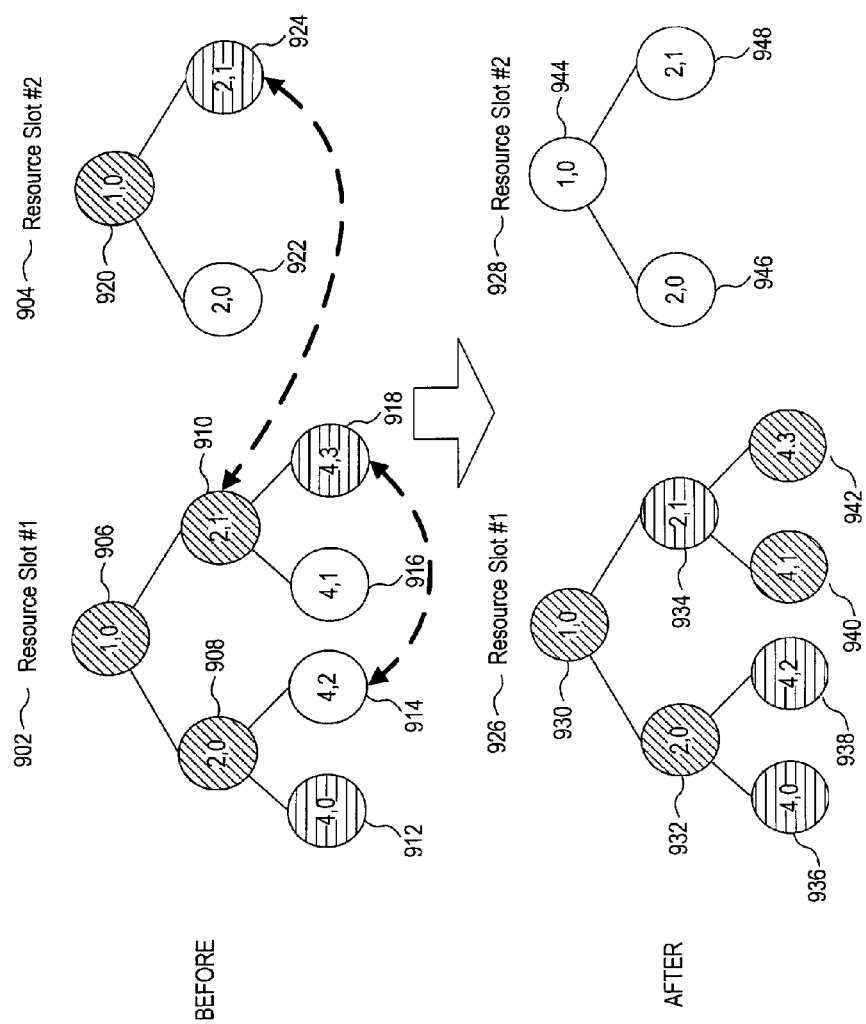
FIG. 9 is a diagram illustrating a reallocation of resources with PATs, consistent with a disclosed embodiment

FIG. 9 is a diagram illustrating a reallocation of resources to resource slots, which are represented by PATs. A base station examines its PATs to determine whether reallocation is necessary, upon de-allocation of a resource. In other words, a de-allocation serves as a triggering condition for reallocation.

For example, the base station may provide a VoIP telephone call to a mobile station. It is assumed that the telephone call ends. Therefore, resource slot(s) that the base station allocated to the VoIP telephone call are de-allocated. Moreover, when a de-allocation occurs, inefficiencies may arise in the overall allocation of resources. One example of this phenomenon is the resource hole problem previously described with reference to FIGS. 5A and 5B.

Further, it may be beneficial to have a resource slot either completely free, or completely allocated, if possible. A completely allocated resource slot is efficiently used, and a completely free resource slot allows for a high degree of flexibility in allocating the resource slot. When a de-allocation occurs, a resource slot that was once fully allocated, may become only partially allocated. Thus, it may be beneficial to increase the allocation for partially allocated trees closer to full allocation, or decrease their allocation so that the corresponding resource slot is free.

Therefore, de-allocation of a resource may create an inefficiency by causing a fully allocated resource slot to become only partially allocated.

Accordingly, FIG. 9 illustrates examples of swapping nodes among PATs, which are used for allocation of resource slots. FIG. 9 includes a BEFORE period, and an AFTER period. The BEFORE period illustrates PATs before node swapping, while the AFTER period illustrates the PATs after the node swapping.

FIG. 9 includes PATs 902 and 904 in the BEFORE period. Tree 902 corresponds to a Resource Slot #1, and tree 904 corresponds to a Resource Slot #2. Tree 902 includes nodes 906-918, while tree 904 includes nodes 922 and 924. Nodes 912, 918, and 924 are allocated to mobile stations, as indicated by their horizontal cross-hatching pattern in FIG. 9. Moreover, in order to avoid collisions, parent nodes 906, 908, 910, and 920 are blocked from being assigned, as indicated by their diagonal cross-hatching pattern in FIG. 9. Moreover, in this example, node 922 has been recently de-allocated from tree 904. This de-allocation caused tree 904 to change from being in a fully allocated state to being in a partially allocated state. This de-allocation triggers a base station storing trees 902 and 904 to evaluate whether or not node swapping would be beneficial to improve efficiency. In the present example, the base station determines that node swapping would be beneficial.

In particular, the base station determines that tree 904 can be rendered completely unallocated, if node 924 can be moved to tree 902. This would cause Resource Slot #2 to be free, which would improve efficiency. Node 924 has a value $(S_c, S_o)$ of $(2, 1)$. A node can be swapped with a different node, if both nodes have the same periodicity value $S_c$. Since node 924 has a periodicity value $S_c$ of 2, the base station seeks to swap node 924, with either node 908 or 910 from tree 902, which both also have a periodicity value $S_c$ of 2.

However, nodes 908 and 910 are blocked from being allocated, because they are parents of child nodes 912 and 918, respectively, allocated to mobile stations. However, if child node 918 is swapped with child node 914, then no child nodes of node 910 will be allocated to any mobile stations. Moreover, child node 914 is unallocated elsewhere. Node 918 can be swapped with node 914 because they both have the same periodicity value $S_c$ of 4. Thus, node 910 would no longer be blocked off.

Therefore, node 918 is swapped with node 914, as indicated in FIG. 9 by an arrow between node 918 and node 914. This swap frees up node 910. Next, node 924 is swapped with node 910. When nodes 918 and 924 are swapped, the mobile station that is assigned to these nodes must be notified of the change in scheduling. The base station notifies the appropriate mobile station(s) by sending a unicast media access control (MAC) message to the mobile station(s) affected by the swap. The swapping is then complete.

FIG. 9 also includes trees 926 and 928 in the AFTER period, which occurs after the swapping has completed. Tree 926 corresponds to Resource Slot #1, and tree 928 corresponds to the Resource Slot #2. Tree 926 includes nodes 930-942, while tree 928 includes nodes 944-948. After the swapping of nodes, nodes 936, 938, and 934 are allocated to mobile stations, as indicated by their horizontal cross-hatching pattern. Moreover, to avoid collisions, parent nodes 930 and 932 are blocked from being assigned, as are child nodes 940 and 942. Therefore, nodes 930, 932, 940, and 942 are shown in the diagonal cross-hatching pattern.

Accordingly, tree 926, corresponding to Resource Slot #1, is fully allocated, while tree 928, corresponding to Resource Slot #2, is free. In this way, node swapping is used to efficiently allocate resources to resource slots.

However, in some situations, the base station determines that a resource requires multiple continuous resource slots. It is assumed that the base station cannot locate enough adjacent resource slots for the allocation. For example, the base station may determine that a number of available multiple continuous resource slots is less than the required multiple continuous resource slots. However, in these situations, the total number of resources available are sufficient to accommodate the allocation, despite not being adjacent.

In such a situation, the base station can destroy data structures associated with allocated ones of the resource slots. The base station may also destroy the PAT for all resource slots, and reallocate the resource slots from scratch. The reallocation of the resource slots is done by first filling top nodes of the PATs (with lower periodicities), where possible. In other words, the base station may reallocate the resource slots by allocating resources to nodes, within the data structure, having lower periodicities before allocating resources to nodes having higher periodicities. This complete reallocation is one way to efficiently allocate resources to the resource slots, so that continuous resource slots can be located and made available.

Figure 10:
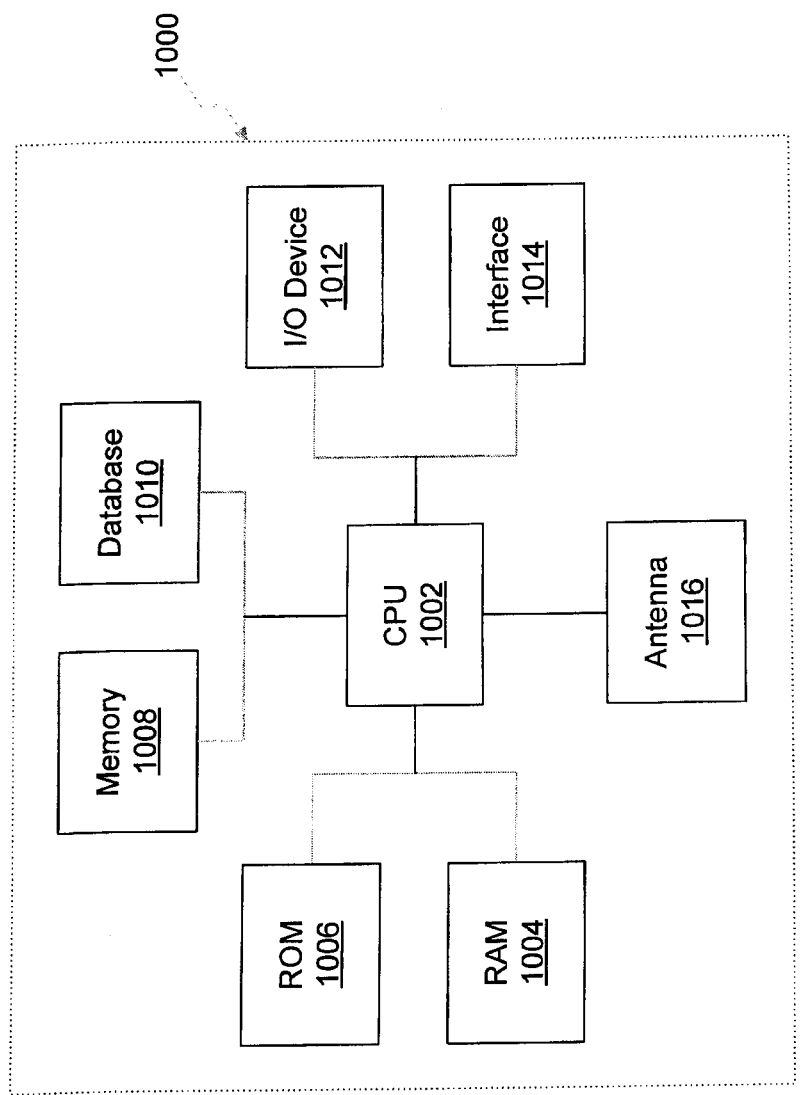
FIG. 10 is diagram illustrating a host that may be used to implement at least one of a mobile station and a base station.

FIG. 10 is a diagram illustrating a host 1000 that may be used to implement at least one of a mobile station or a base station. Host 1000 may include one or more of the following components: at least one central processing unit (CPU) 1002 configured to execute computer program instructions to perform various processes and methods, random access memory (RAM) 1004 and read only memory (ROM) 1006, which may include one or more computer-readable media, configured to access and store information and computer program instructions, memory 1008 to store data and information, one or more databases 1010 to store tables, lists, or other data structures, one or more I/O devices 1012 such as input ports and/or output ports, one or more interfaces 1014, and one or more antennas 1016. Each of these components is well-known in the art.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for allocating a mobile station to an available resource slot of a plurality of resource slots within a stream of data frames, the stream of data frames broadcasted to the mobile station by a base station, the method comprising:
determining a resource to be provided to the mobile station;
scanning the resource slots to identify the available resource slot, the available resource slot available for assignment to the resource, wherein the resource slots are included in all of the data frames in the stream of data frames, the scanning further including retrieving a data structure of the available resource slot, the data structure having nodes, the nodes associated with different periodicities and different offsets of the periodicities;
assigning the mobile station to one of the nodes of the available resource slot with an associated periodicity and an associated offset of the periodicity; and
broadcasting the resource in the available resource slot, at a location within the stream of data frames indicated by the associated periodicity and the associated offset.

2. The method of claim 1, wherein assigning the mobile station further comprises:
determining that the mobile station is an emergent mobile station having a particular delay requirement;
assigning the mobile station to the one node, wherein the offset of the one node meets the delay requirement of the mobile station.

3. The method of claim 1, further comprising:
sending a scheduling message to the mobile station, the scheduling message indicating the resources slot that includes the resource for the mobile station, the scheduling message further indicating the periodicity associated with providing the resource;
broadcasting the stream of data frames to the mobile station, wherein the resource is included in the stream of data frames, in the one resource slot, at a frequency indicated by the periodicity of the one node.

4. The method of claim 1, further comprising:
blocking a parent node of the one node, in the data structure, to prevent the parent node from being assigned to a different resource, to avoid scheduling collisions, wherein the parent node is associated with a different periodicity than the one node.

5. The method of claim 1, wherein the resource is a first resource and the one node is a first node, the method further comprising:
locating a second node that is unallocated and has the same periodicity as the periodicity of the first node;
swapping the first node with the second node; and
sending a message to the mobile station, informing the mobile station of the swapping.

6. The method of claim 1, further comprising:
determining that the resource requires allocation of multiple continuous ones of the resource slots;
determining that a number of available multiple continuous ones of the resource slots is less than the required multiple continuous resource slots;
determining that an overall number of available resource slots is larger than the required multiple continuous resource slots;
destroying data structures associated with allocated ones of the resource slots to de-allocate the allocated ones of the resource slots; and
reallocating the resource slots by allocating resources to nodes, within the data structures, having lower periodicities before allocating resources to nodes having higher periodicities.

7. The method of claim 1, further comprising:
determining a data frame, within the stream of data frames, broadcast with the one resource according to the following equation:

$$F \bmod S_c = S_o,$$

wherein F is a sequence number of the data frame, $S_c$ is the periodicity of the one node, and $S_o$ is the offset of the one node.

8. The method of claim 1, further comprising:
allocating the resource to a plurality of adjacent resource slots;
retrieving data structures for each of the adjacent resource slots;

allocating a common node, in each of the data structures, to the resources,
wherein each of the common nodes allocated in each of the data structures have common periodicity values and common offset values.

9. A non-transitory computer-readable medium comprising program instructions, which, when executed by a processor, cause the processor to perform a method for allocating a mobile station to an available resource slot of a plurality of resource slots within a stream of data frames, the stream of data frames broadcasted to the mobile station by a base station, the method comprising:
determining a resource to be provided to the mobile station;
scanning the resource slots to identify the available resource slot, the available resource slot available for assignment to the resource, wherein the resource slots are included in all of the data frames in the stream of data frames, the scanning further including retrieving a data structure of the available resource slot, the data structure having nodes, the nodes associated with different periodicities and different offsets of the periodicities;
assigning the mobile station to one of the nodes of the available resource slot with an associated periodicity and an associated offset of the periodicity; and
broadcasting the resource in the available resource slot, at a location within the stream of data frames indicated by the associated periodicity and the associated offset.

10. The non-transitory computer-readable medium of claim 9, wherein assigning the one mobile station further comprises:
determining that the mobile station is an emergent mobile station having a particular delay requirement;
assigning the mobile station to the one node, wherein the offset of the one node meets the delay requirement of the mobile station.

11. The non-transitory computer-readable medium of claim 9, the method further comprising:
sending a scheduling message to the one mobile station, the scheduling message indicating the resource slot that includes the resource for the mobile station, the scheduling message further indicating the periodicity associated with providing the resource;
broadcasting the stream of data frames to the mobile stations, wherein the resource is included in the stream of data frames, in the one resource slot, at a frequency indicated by the periodicity of the one node.

12. The non-transitory computer-readable medium of claim 9, the method further comprising:
blocking a parent node of the one node, in the data structure, to prevent the parent node from being assigned to a different resource, to avoid scheduling collisions, wherein the parent node is associated with a different periodicity than the one node.

13. The non-transitory computer-readable medium of claim 9, wherein the resource is a first resource and the one node is a first node, the method further comprising:
locating a second node that is unallocated and has the same periodicity as the periodicity of the first node;
swapping the first node with the second node; and
sending a message to the mobile station, informing the mobile station of the swapping.

14. The non-transitory computer-readable medium of claim 9, the method further comprising:
determining that the resource requires allocation of multiple continuous ones of the resource slots;
determining that a number of available multiple continuous ones of the resource slots is less than the required multiple continuous resource slots;
determining that an overall number of available resource slots is larger than the required multiple continuous resource slots;
destroying data structures associated with allocated ones of the resource slots to de-allocate the allocated ones of the resource slots; and
reallocating the resource slots by allocating resources to nodes, within the data structures, having lower periodicities before allocating resources to nodes having higher periodicities.

15. The non-transitory computer-readable medium of claim 9, the method further comprising:
determining a data frame, within the stream of data frames, broadcast with the one resource according to the following equation:

$$F \bmod S_c = S_o,$$

wherein F is a sequence number of the data frame, $S_c$ is the periodicity of the one node, and $S_o$ is the offset of the one node.

16. The non-transitory computer-readable medium of claim 9, the method further comprising:
allocating the resource to a plurality of adjacent resource slots;
retrieving data structures for each of the adjacent resource slots;
allocating a common node, in each of the data structures, to the resources,
wherein each of the common nodes allocated in each of the data structures have common periodicity values and common offset values.

17. A base station for allocating a mobile station to an available resource slot of a plurality of resource slots within a stream of data frames, the stream of data frames broadcasted to the mobile station by the base station, the base station comprising:
memory configured to store a data structure having nodes, the nodes associated with different periodicities and different offsets of the periodicities;
a processor configured to:
determine a resource to be provided to the mobile station; and
scan the resource slots to identify the available resource slot, the available resource slot available for assignment to the resource, wherein the resource slots are included in all of the data frames in the stream of data frames the scanning further including retrieving the data structure from memory, the data structure associated with the available resource slot; and
assign the mobile station to one of the nodes of the available resource slot with an associated periodicity and an associated offset of the periodicity; and
an output port configured to broadcast the resource in the available resource slot, at a location within the stream of data frames indicated by the associated periodicity and the associated offset.

18. The base station of claim 17, wherein the processor is further configured to:
determine that the mobile station is an emergent mobile station having a particular delay requirement;
assign the mobile station to the one node, wherein the offset of the one node meets the delay requirement of the mobile station.

19. The base station of claim 17, wherein the output port is further configured to:
- send a scheduling message to the mobile station, the scheduling message indicating the resource slot that includes the resource for the mobile station, the scheduling message further indicating the periodicity associated with providing the resource;
- broadcast the stream of data frames to the mobile stations, wherein the resource is included in the stream of data frames, in the one resource slot, at a frequency indicated by the periodicity of the one node.

20. The base station of claim 17, the processor further configured to:
- block a parent node of the one node, in the data structure, to prevent the parent node from being assigned to a different resource, to avoid scheduling collisions, wherein the parent node is associated with a different periodicity than the one node.

21. The base station of claim 17, wherein the resource is a first resource and the one node is a first node, the processor further configured to:
- locate a second node that is unallocated and has the same periodicity as of the periodicity of the first node;
- swap the first node with the second node; and
- send a message to the mobile station, informing the mobile station of the swapping.

22. The base station of claim 17, the processor further configured to:
- determine that the resource requires allocation of multiple continuous ones of the resource slots;
- determine that a number of available multiple continuous ones of the resource slots is less than the required multiple continuous resource slots;
- determining that an overall number of available resource slots is larger than the required multiple continuous resource slots;
- destroy data structures associated with allocated ones of the resource slots to de-allocate the allocated ones of the resource slots; and
- reallocate the resource slots by allocating resources to nodes, within the data structures, having lower periodicities before allocating resources to nodes having higher periodicities.

23. The base station of claim 17, the processor further configured to:
- determine a data frame, within the stream of data frames, broadcast with the one resource according to the following equation:

$$F \bmod S_c = S_o,$$

wherein F is a sequence number of the data frame, $S_c$ is the periodicity of the one node, and $S_o$ is the offset of the one node.

24. The base station of claim 17, the processor further configured to:
- allocating the resource to a plurality of adjacent resource slots;
- retrieving data structures from the memory for each of the adjacent resource slots;
- allocating a common node, in each of the data structures, to the resources,
- wherein each of the common nodes allocated in each of the data structures have common periodicity values and common offset values.

* * * * *